Patented Sept. 18, 1934

1,974,069

UNITED STATES PATENT OFFICE 1,974,069

DRYING PROCESS

Paul S. Greer, Charleston, W. Va., assignor to Carbide and Carbon Chemicals Corporation, a corporation of New York No Drawing. Application June 4, 1932, Serial No. 615,468

6 Claims. (Cl. 202—56)

The invention is a process for drying ethyl ether, and broadly comprises mixing the ethyl ether, containing water in amounts which cannot be separated therefrom by ordinary fractional distillation, with a hygroscopic, relatively non-volatile organic liquid which will not affect or be affected chemically by ethyl ether, and then distilling the ether out of the two-phase mixture.

For many purposes it is necessary or desirable to produce ethyl ether which is dry or substantially dry from ethyl ether containing water. It is impossible by ordinary fractional distillation to remove water from ethyl ether which is saturated or nearly saturated with water. Various expedients for producing dry ethyl ether from such solutions have been proposed; but efficient, economical and practically feasible methods for accomplishing this result on an industrial scale have not heretofore been known. The principal object of my invention is to provide such a process. The advantages and economy of my invention will be apparent.

One method of practicing my invention is shown by the following example:

Three volumes of ethyl ether, sp. gr. 0.720 at 20° C., containing about 2% of water, were agitated with one volume of ethylene glycol and the mixture was distilled. All of the ether except about the last 4% (by volume) to be distilled over tested dry, as shown by a clear solution resulting when an equal volume of carbon disulfide was added to samples of the ethyl ether. This test proved the water content to be less than 0.6%.

By employing the proportions set forth, the same batch of ethylene glycol could be used to dry six successive batches of ethyl ether of similar water content. The glycol may then be freed from water by a separate distillation, and reused as fresh reagent.

Other drying agents which may be used in place of ethylene glycol, and with which I have obtained results similar to those obtained by the use of ethylene glycol, are other glycols and polyglycols of the 1,2 series, such as diethylene glycol and propylene glycol; glycerol; and triethanolamine. Any hygroscopic relatively non-volatile organic liquid which is chemically inert with respect to ethyl ether may be used. In general, the amount of drying agent used should be from about ⅕ to ½ the volume of water-containing ethyl ether to be dried. Liquids which form azeotropic mixtures with ethyl ether are, of course, not contemplated for use in my process.

It will be seen that my invention provides a simple, efficient and economical method for producing substantially dry ethyl ether from ether containing water the removal of which is impossible by ordinary fractional distillation. Modifications of my process are possible, and are included in the invention as defined by the appended claims.

I claim:—

1. Process for producing substantially dry ethyl ether from ethyl ether water solutions, the removal of the water being impossible by ordinary fractional distillation, which process comprises mixing the ethyl ether with a hygroscopic, relatively non-volatile organic liquid which is chemically inert with respect to and which does not form azeotropic mixtures with ethyl ether, and distilling the ethyl ether out of the two-phase mixture.

2. Process for producing substantially dry ethyl ether from ethyl ether water solutions, the removal of the water being impossible by ordinary fractional distillation, which process comprises mixing the ethyl ether with an organic liquid of the group consisting of glycols and polyglycols of the 1,2 series, glycerol and triethanolamine, and distilling the ethyl ether out of the two-phase mixture.

3. Process for producing substantially dry ethyl ether from ethyl ether water solutions, the removal of the water being impossible by ordinary fractional distillation, which process comprises mixing the ethyl ether with about ⅕ to ½ its volume of a hygroscopic, relatively non-volatile organic liquid which is chemically inert with respect to and which does not form azeotropic mixtures with ethyl ether, and distilling the ethyl ether out of the two-phase mixture.

4. Process for producing substantially dry ethyl ether from ethyl ether water solutions, the removal of the water being impossible by ordinary fractional distillation, which process comprises mixing the ethyl ether with ⅕ to ½ its volume of an organic liquid of the group consisting of glycols and polyglycols of the 1,2 series, glycerol and triethanolamine, and distilling the ethyl ether out of the two-phase mixture.

5. Process for producing substantially dry ethyl ether from ethyl ether water solutions, the removal of the water being impossible by ordinary fractional distillation, which process comprises mixing the ethyl ether with ethylene glycol, and distilling the ethyl ether out of the two-phase mixture.

6. Process for producing substantially dry ethyl ether from ethyl ether water solutions, the removal of the water being impossible by ordinary fractional distillation, which process comprises mixing the ethyl ether with about ⅓ its volume of ethylene glycol, and distilling the ethyl ether out of the two-phase mixture.

PAUL S. GREER.